United States Patent [19]
Phinney

[11] 3,721,860
[45] March 20, 1973

[54] BLASTING MACHINE HAVING A MANUALLY OPERABLE PERMANENT MAGNET GENERATOR AND ANTI-DEMAGNETIZATION CIRCUIT

[75] Inventor: Earl M. Phinney, Oneonta, N.Y.

[73] Assignee: The Bendix Corporation, Southfield, Mich.

[22] Filed: March 3, 1972

[21] Appl. No.: 231,699

[52] U.S. Cl. .......................317/80, 310/69, 307/106, 315/163, 320/1, 322/40, 102/70.2
[51] Int. Cl. ..................................................F23g 7/02
[58] Field of Search ....317/80; 102/70.2; 310/69, 83; 315/163; 307/106; 320/1; 322/40

[56] References Cited

UNITED STATES PATENTS

| | | | |
|---|---|---|---|
| 2,313,101 | 3/1943 | Stuart, II | 310/69 |
| 2,326,696 | 8/1943 | Stouddard | 317/80 |
| 3,133,231 | 5/1964 | Jean-Pierre Fait et al. | 317/80 |
| 3,275,884 | 9/1966 | Segall et al. | 315/163 |
| 3,370,220 | 2/1968 | Douglass et al. | 322/40 |
| 3,417,306 | 12/1968 | Knak | 320/1 |
| 3,541,393 | 11/1970 | Diswood | 317/80 |
| 3,571,609 | 3/1971 | Knudson | 307/106 |

Primary Examiner—Volodymyr Y. Mayewsky
Attorney—Raymond J. Eifler et al.

[57] ABSTRACT

A manually operable blasting machine for firing an explosive bridge wire device or the like. A hand-cranked permanent magnet alternator is manually operated to generate an alternating current which is first rectified and then stored in a capacitor to be discharged when sufficient energy ix available to detonate an explosive bridge wire device or the like. The rectifying circuit is a unique voltage multiplier circuit that charges a plurality of capacitors in parallel on the positive half-cycle of the alternator and charges them in series on the negative half-cycle of the alternator. This novel arrangement of the capacitors in the rectifying circuit minimizes degmanetization of the permanent magnet in the rotor of the alternator which is normally associated with hand-cranked blasting machines of this type.

21 Claims, 2 Drawing Figures

OUTPUT TO
BLASTING CAPS 3,721,860

BLASTING MACHINE HAVING A MANUALLY OPERABLE PERMANENT MAGNET GENERATOR AND ANTI-DEMAGNETIZATION CIRCUIT

BACKGROUND OF THE INVENTION

This invention relates to an improved hand-cranked blasting machine for detonating blasting caps or the like. The invention is more particularly related to the electrical circuitry associated with the current rectifying circuit of the manually operable electric generator that supplies the energy necessary to detonate explosive devices.

In blasting and demolition operations it is customary to set the explosives in place, affix electric blasting caps to those explosives, connect those electric blasting caps in electrical circuit relationship, and then to actuate the blasting caps by discharging electrical energy from a blasting machine into the blasting caps. Basically, there are two types of blasting machines: (1) those which require a source of electric power; and (2) those which generate their own electrical power by manually operating an electromechanical device such as an electric generator.

Examples of blasting machines which do not include an electric generator may be found in U.S. Pat. No. 3,417,306 entitled "Regulator Voltage Capacitor Discharge Circuit" to J. L. Knak, issued Dec. 17, 1968 and U.S. Pat. No. 3,275,884 entitled "Electrical Apparatus for Generating Current Pulses" to L. H. Segall et al., issued Sept. 27, 1966. These devices require a source of power such as a battery, an oscillator, a transformer responsive to the oscillator for stepping up the pulses therefrom, a storage capacitor which is charged by the pulses from the transformer, and a trigger circuit which allows the energy stored in the capacitor to discharge and fire an explosive device attached to the output of the capacitor.

Examples of blasting machines that include a manually operated electrical generator may be found in U.S. Pat. No. 2,313,101 entitled "Blasting Machine" to J. Stuart II, issued Mar. 9, 1943; U.S. Pat. No. 2,326,696 entitled "Blasting Machine" to R. N. Stoddard, issued Aug. 10, 1943; and U.S. Pat. No. 3,370,220 entitled "Hand Operated Blasting Generator" to V. J. Douglass et al. issued Feb. 20, 1968. Blasting machines of this type operate similar to battery powered and 115 volt AC powered blasting machines except that the electrical energy supplied to the circuit is generated by the operator of the blasting machine by turning a hand crank attached to the rotor of an electric generator.

A blasting machine that receives its electrical power from a hand-cranked permanent magnet alternator has the advantage of not requiring either batteries that must be recharged or replaced, or AC power lines. In some blasting applications the freedom from batteries and power lines is desirable and at some times necessary, especially in remote locations. However, blasting machines utilizing a generator that generates an alternating current require a current rectifying circuit between the energy storage capacitor and the electric generator. In the interest of economy, full wave rectifier bridges are not utilized because of the number of components required. Therefore, most rectifier circuits are half-wave voltage doubler or voltage tripler circuits. For an example of such a circuit see the previously referenced patent to Douglass, U.S. Pat. No. 3,370,220. However, a serious problem is encountered with this type of arrangement in view of the fact that the voltage doubler circuit exhibits resonance between the alternator inductance and the doubler capacitors when the alternator is cranked to produce an alternating current. The resonance produced tends to increase the load current in the alternator and sufficiently large capacitive load currents will demagnetize the permanent magnet in the rotor of the alternator. Obviously this is undesirable, as repeated operation of the electric generator causes the rotor magnet to be demagnetized and therefore produce less and less current each time the blasting machine is operated. Attempts made to compensate for this undesirable resonance lead only to inefficient alternator design, and the use of smaller capacitors in the voltage doubler circuit to put the resonant frequency out of the range of the cranking speed leads to inefficient usage of the alternator. Lastly, any attempt to use electrical resistors to damp out the resonance only leads to dissipation of power and inefficient transfer of power from the electric generator to the energy storage device.

SUMMARY OF THE INVENTION

This invention prevents the demagnetization of the permanent magnet in the alternator of a hand-cranked blasting machine.

The invention is a hand-cranked blasting machine characterized by a current rectifying circuit that prevents the demagnetization of the permanent magnets associated with the current generator. The circuit of the invention is characterized by a voltage multiplier circuit that is a unique arrangement of capacitors and diodes to provide alternate parallel and series charging of at least two capacitors on each half-cycle of the alternating current source.

The invention is further characterized by an AC LC circuit wherein resonant currents are suppressed by an alternating impedance as a result of alternate series and parallel charging of capacitive circuit elements.

In one embodiment of the invention a blasting machine for detonating blasting caps or the like comprises: an alternating current generator manually operable to produce electrical energy, the generator having a rotor that includes at least one permanent magnet and a stator; a plurality of capacitors for storing the electrical energy produced by operation of the generator; a switch for discharging the energy stored in the capacitor through the blasting caps when the energy in the capacitor reaches a predetermined level; and means for rectifying the alternating current generated by the operation of the generator in a manner that alternately charges the capacitors in series and then in parallel to suppress resonant currents in the stator winding whereby demagnetization of the rotor permanent magnet associated with the stator is suppressed.

Accordingly, it is an object of this invention to provide a rectifying circuit for a hand-cranked AC generator of a blasting machine that eliminates and/or minimizes the resonance between the stator winding of the AC generator and the capacitors of the rectifier circuit so that the permanent magnet in the rotor of the AC generator is not demagnetized.

It is another object of this invention to provide an improved handcranked blasting machine.

Still another object of this invention is to provide an electrical circuit for a hand-cranked blasting machine that maximizes the transfer of power from the output of hand-cranked electrical generator to a storage capacitor which is discharged at a predetermined energy level to detonate blasting caps or the like.

Yet another object is to provide a voltage tripler circuit for a hand-cranked blasting machine that suppresses resonant currents in the stator of the blasting machine.

The above and other objects and features of this invention will become apparent from the following detailed description taken in conjunction with the accompanying drawings and claims which form a part of this specification.

DETAILED DESCRIPTION OF THE DRAWINGS

Figures 1, 2:
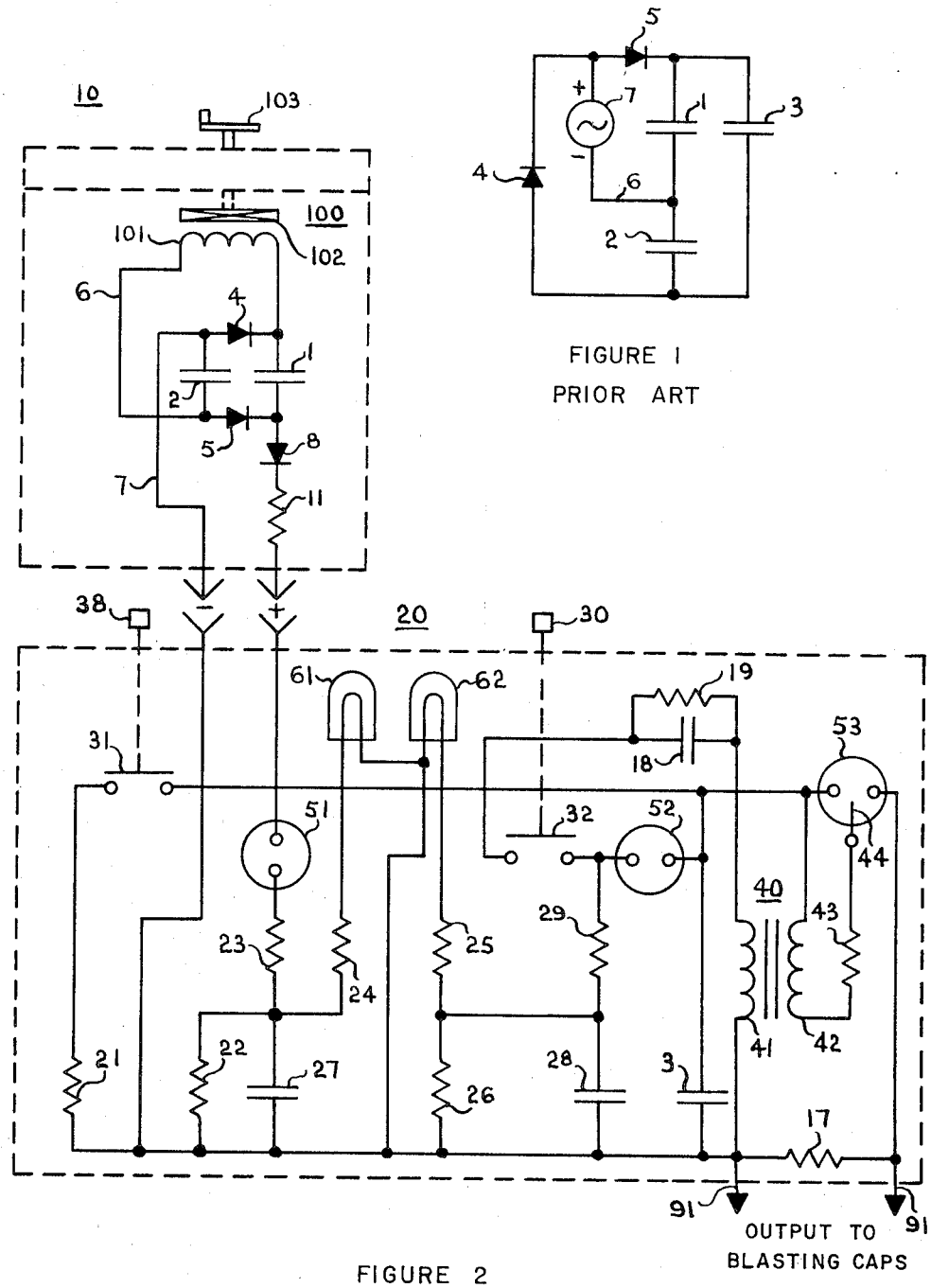
FIG. 1 is a prior art schematic diagram of a half-wave voltage doubler.
FIG. 2 is a schematic diagram of a preferred embodiment of the circuitry associated with a hand-cranked blasting machine.

Referring now to the drawings, FIG. 1 illustrates a conventional full-wave doubler rectifier. The description of this prior art circuit is given so that the functional objects, functional distinctions and economic advantages of the invention illustrated in FIG. 2 will be more readily appreciated. This circuit includes diodes 4 and 5 in combination with capacitors 1 and 2 which are charged in series on each half-cycle of the AC source 7 shown. Capacitor 3 attains a voltage equal to twice the magnitude of a voltage across capacitor 1 or 2. The capacitors shown are charged as follows: on the positive half-cycle of the AC current source 7, current flows through diode 5 and capacitor 1 through lead 6 to the AC source 7. Simultaneously current flowing through diode 5 also flows through capacitor 3, then through capacitor 2 and lead 6 to the AC source 7. During the negative half-cycle of the AC source 7, current flows as follows: through lead 6, capacitor 2, diode 4 and then to the AC source 7. Simultaneously the current flowing through lead 6 also flows through capacitor 1, capacitor 3 and then through diode 4 to the AC source 7. In this embodiment the capacitor 3 has a capacitance much larger than capacitors 1 and 2 and therefore it presents essentially a zero AC impedance in the circuit. Therefore, when the AC source 7 is an alternator, the AC load seen by the alternator is equal to the capacitance of capacitors 1 and 2 for both the positive and negative half-cycle. In other words, the impedance seen by the alternator 7 is the same for both the positive and negative half-cycle. With this circuit arrangement, resonance occurs when the alternator rotor rotates at a speed wherein the inductive reactance of the alternator equals the capacitive reactance of the doubler.

When a voltage doubler circuit of this type is used in combination with a hand-cranked alternating current generator, the voltage doubler circuit exhibits resonance between the alternator inductor (stator winding) and the doubler capacitors when the alternator is cranked at the correct speed. This resonance produces an increased load current in the alternator of sufficient magnitude to cause demagnetization of the permanent magnets in the alternator rotor. Obviously continued use of the alternator will result in demagnetization of the rotor magnets and the eventual loss of the ability of the generator to produce an alternating current of a useful magnitude.

FIG. 2 is a schematic diagram of a hand-cranked blasting machine that utilizes the principles of this invention. In this embodiment the blasting machine includes a first assembly 10 that contains the manually operated AC generator and the rectifying circuit which is electrically connected to the energy storage module 20 that is connected to explosive bridge wire devices or the like.

The first assembly 10 includes an AC generator that has a hand crank for rotating a permanent magnet rotor 102 past a stator winding 101 to generate an alternating electrical current. Preferably the AC generator has a gear ratio of about 36:1 so that rotating the hand crank 103 at a speed of 125 rpm will generate a rotor speed of 4,500 rpm which, in turn, will generate an alternating voltage of 1,000 volts at the stator 101 when the stator winding has 7,800 turns and a peak voltage across each capacitor 1, 2 of about 1,000 volts.

The circuit that rectifiers the alternating current from the stator winding 101 comprises a plurality of diodes 4, 5, 8 and capacitors 1, 2 arranged in a novel fashion that limits the peak value of current in the circuit caused by resonance of the capacitors 1, 2 with the primary winding of the stator 101. This circuit is designed to reduce the resonance between capacitors 1 and 2 of the circuit and the stator winding 101 of the alternator 100. In this circuit rectifiers 4, 5, 8 are arranged in circuit relationship with capacitors 1, 2, 3 to produce a DC voltage across capacitors 1 and 2 equal to approximately three times the peak AC voltage produced by the AC generator 7. Capacitors 1 and 2 are charged as follows: during the positive half of the cycle capacitors 1 and 2 of this circuit are charged in series through capacitor 3 as current flows through capacitor 1, diode 8, capacitor 3, capacitor 2 and lead 6 to the AC source 7. During the negative half of the cycle capacitors 1 and 2 are charged in parallel as current flows through lead 6, diode 5 and through capacitor 1 to the current source 7 and simultaneously through lead 6, capacitor 2, diode 4 to current source 7. It is important to note at this point that on the positive half-cycle, capacitors 1 and 2 are charged in series while on the negative half-cycle capacitors 1 and 2 are charged in parallel. Therefore, in this circuit the AC source 7 will be presented with one impedance load on the positive half-cycle and a different impedance load on the negative half-cycle. It is this alternating unbalanced impedance load that destroys the continuity of current buildup in a resonant circuit and therefore reduces the effect of resonance.

An operational test of the rectifier portion of the circuit shown in FIG. 2 wherein capacitor 3 had a capacitance of more than 100 times greater than capacitors 1 and 2 revealed that the effect of resonance was not completely eliminated, as there still remained some peaking of output current. However, the peak output current that did occur was much less pronounced than that observed with the circuit shown in FIG. 1. The test further revealed that when the circuit shown in FIG. 2 was used in combination with a hand-cranked blasting machine, any resonance between the circuit and the inductive windings of the generator was suppressed to a value below which any appreciable demagnetization of the permanent magnets in the rotor occurred.

The second assembly 20 includes a main energy storage capacitor 3; a voltage regulator circuit; a trigger circuit; a trigger pulse generating circuit; and an output to be connected to blasting caps or the like.

Switch 31, in combination with resistor 21, operates to discharge capacitor 3 when the apparatus is not in use by depressing push button 38. Although this switch is shown as an independent switch, it could be part of switch 32 so that when switch 32 is in the open positions, switch 31 would be in the normally closed position to drain any charge on capacitor 3.

Switch 32 is the firing switch. By depressing push button 30, the firing switch 32 completes the electrical circuit that permits trigger pulses to be applied to the primary winding 41 of the trigger transformer 40. As an additional safety feature switch 32 may have additional contacts (not shown) that completely isolate the output leads from the voltage on capacitor 3.

The voltage regulator circuitry that prevents the voltage on capacitor 3 from exceeding a predetermined value includes a 2-electrode spark gap discharge device 51, a resistor 22, a capacitor 27 and an indicator light 61 in combination with a resistor 24. The function of the regulator circuit is to drain excessive energy off the storage capacitor 3 and thereby prevent the storage capacitor from exceeding a predetermined upper limit. The spark gap device 51 is a normally non-conducting device that conducts when the voltage across the device has reached a predetermined voltage. In this instance the breakdown voltage of the spark gap device 51 is chosen to be the predetermined upper voltage limit desired across the storage capacitor 3. In operation, the voltage across the storage capacitor 3 appears across the spark gap device 51. As the storage capacitor 3 is charged, the voltage across the spark gap 51 increases until the breakdown voltage of the device is reached. The spark gap device 51 then breaks down and conducts current to charge capacitor 27. The current through the spark device 51 decreases as capacitor 27 becomes more fully charged. Eventually the current through the spark device 51 decreases to the point where it no longer will support an arc in the discharge device 51. The arc extinguishes and spark gap device 51 ceases conducting. The charge on capacitor 27 is then discharged through resistor 22. As capacitor 27 discharges, the voltage across the spark gap 51 increases, and if the voltage across the storage capacitor 3 is still greater than the breakdown voltage of the spark gap discharge device 51, the discharge device 51 again conducts and the cycle is repeated again. In this embodiment, although not necessary, a neon indicator light 61 in combination with resistor 24 is used to give an indication that the voltage regulator is operating. The voltage indicator light 61 gives a visual indication when the voltage across the capacitor 27 is of sufficient value to cause the indicator light 61 to illuminate.

The trigger pulse generator circuit includes a 2-electrode spark gap discharge device 52, resistor 29, capacitor 28, resistor 25, resistor 26 and indicator light 62. The voltage indicator light 62, such as a neon bulb, is in circuit relationship with resistors 25 and 26 and is responsive to the charging and discharging of capacitor 28. In operation the normally nonconducting 2-electrode spark discharge device 52 will remain in a nonconducting state as long as the voltage on the storage capacitor 3 is less than the breakdown voltage of the spark discharge device 52. When the voltage on the storage capacitor 3 exceeds the breakdown voltage of the discharge device 52, the discharge device conducts, allowing current to pass through resistor 29 to charge capacitor 28. As the voltage on the capacitor 28 increases, the voltage across the spark discharge device 52 decreases until the spark device 52 returns to the original nonconducting state. At this time capacitor 28 then discharges through resistors 25 and 26 which further applies a voltage to the neon indicator light 62 to give an indication that the circuit is in operation. When the voltage across the spark discharge device 52 again rises to the breakdown potential of this device, conduction begins again and the cycle repeats itself. Each time capacitor 28 is charged, voltage is applied to the neon indicator light 62 through the resistor divider network 25 and 26. The neon indicator light 62 stays lit until the voltage across the light drops below the minimum sustaining voltage of the light 62. By this means, each time capacitor 28 is charged, there is a visible light pulse to signal the operator that the minimum voltage has been reached and the blasting machine may be fired. With the circuit, when the minimum voltage across the capacitor 3 is reached and pulses are being generated by the pulse generator, pressing the firing button 30 closes switch 32 in the firing circuit to allow the pulses to be transmitted to the primary winding 41 of the transformer 40 in the firing circuit.

The firing circuit includes a 3-electrode spark gap discharge device 53; a step-up transformer 40 for raising the voltage of the pulses received from the trigger pulse generator and applying them to the trigger electrode 44 of the spark gap discharge device 53; and a push button switch 30 which permits the trigger pulses from the pulse generator to be transmitted to the primary winding 41 of the step-up transformer 40. In operation, switch 32 is normally open (in the OFF position) and no pulses are being supplied to the spark discharge gap device 53, thereby preventing the firing of any blasting caps attached to the output terminals 91. The firing switch 32 in the OFF position may be arranged in combination with switch 31 so that discharge resistor 21 would be across the storage capacitor 3 to drain any charge thereon. When the firing button 30 is depressed, switch 32 is in the ON position and the storage capacitor 3 will discharge if trigger pulses are present. Therefore, to discharge the energy in capacitor 3 through blasting caps attached to the output terminals 91, it is necessary that the pulse generator be generating pulses and that the firing switch 32 be in the ON position. When these two conditions are met, the output pulses of the pulse generator are transmitted to the primary winding 41 of the step-up transformer 40 where the pulses are stepped up to a higher voltage and applied to the trigger electrode 44 of the spark gap discharge device 53 through resistor 43, thereby causing ionization within the spark gap discharge device 53 and permitting current to flow through the two main electrodes which allows the energy storage capacitor 3 to discharge through the blasting cap connected to the output terminals 91. If it is desired to eliminate manual firing of the blasting caps and to have the blasting machine automatically discharge the energy in the capacitor 3 when it has reached a predetermined energy level, the switch 32 may be eliminated completely. In this instance, as soon as trigger pulses are generated by the trigger pulse generating circuit, the 3-electrode spark discharge device 53 would be triggered to discharge the energy in the capacitor 3 through the blasting caps connected to the output terminals 91.

OPERATION

Referring now to FIG. 2, the circuit operates as follows: when switch 31 is closed, resistor 21 removes the energy stored in capacitor 3. When switch 31 is open, resistor 21 is removed from the circuit. To provide energy for capacitor 3 the crank 103 is rotated to generate an alternating voltage in stator 101. This alternating voltage is then rectified and amplified by diodes 4 and 5 and capacitors 1 and 2. The rectified current then travels through current limiting resistor 11 and blocking diode 8 to the capacitor 3 where the energy is stored until the capacitor is discharged. Capacitor 3 is preferably a nonelectrolytic capacitor as an electrolytic capacitor would have a shorter life in this type of circuit.

As the energy stored in the capacitor 3 reaches a predetermined energy level, the pulse generator circuit containing spark gap device 52 begins generating trigger pulses. This occurs when the spark gap discharge device 52 reaches its breakdown potential. To assure that the energy stored in the capacitor is above the predetermined energy level but not in excess of a second higher energy level, the voltage regulating circuit, which includes spark gap device 51, is utilized. This eliminates excessive energy levels that cause adverse operation of the blasting machine.

Once the trigger pulses are present and the energy stored in the capacitor is within a preferred energy range, indicator lights 61 and 62 will be giving visual indication that there is sufficient energy present to detonate explosives attached to the output 91. Depressing the firing switch 30 at that time applies trigger pulses to the transformer 40 which causes spark gap device 53 to conduct, thereby allowing the energy in capacitor to discharge into the blasting caps attached to the output.

In one satisfactorily operable system, the blasting machine described in FIG. 2 included circuit elements that had the values or were of the types indicated below:

| | |
|---|---|
| Capacitor 1 | 0.45–.61 microfarad, 3KV |
| Capacitor 2 | 0.45–.61 microfarad, 3KV |
| Capacitor 3 | 400 microfarad, 2.5KV |
| Capacitor 18 | 0.025–.03 microfarad, 3KV |
| Capacitor 27 | 0.45–.61 microfarad, 3KV |
| Capacitor 28 | 0.008–.012 microfarad, 3.5KV |
| Diodes 4, 5, 8 | Motorola MR 995A |
| Indicator Lights (Neon) 61, 62 | NE-17 |
| Push Button Switches 31, 32 | The Bendix Corp., Sidney, N. Y. Part No. 10–348773–1 |
| Resistor 11 | 2K ohms, 5W |
| Resistor 17 | 10K ohms, 10W |
| Resistor 19 | 20 megohms, 1W |
| Resistor 21 | 3K ohms, 10W |
| Resistor 22 | 20K ohms, 20W |
| Resistor 23 | 2 ohms, 20W |
| Resistor 24 | 2.72 megohms, 4W |
| Resistor 25 | 2.72 megohms, 4W |
| Resistor 26 | 0.33 megohms, 2W |
| Resistor 29 | 50 ohms, 10W |
| Resistor 43 | 1K ohms, 5W |
| Spark Gap Discharge Device 51 | 2,000 volts dc (breakdown) The Bendix Corp., Sidney, N. Y. Part No. 10–374105–21 |
| Spark Gap Discharge Device 52 | 1800 volts dc (breakdown) The Bendix Corp., Sidney, N. Y. Part No. 10–374121–14 |
| Spark Gap Discharge Device 53 | 3-electrode The Bendix Corp., Sidney, N. Y. Part No. L–28615–39 |
| Transformer 40 | Ferramic core ⅜" diameter Primary 4T, No. 20 Secondary 32T, No 20 The Bendix Corp., Sidney, N. Y. Part No. L–28615–25 |
| Alternating Current Generator | Winding 7800T, No. 32 HI Rotor, 2" dia. × 1" long ALNICO VI Gear ratio 36:1 |

While a preferred embodiment of the invention has been disclosed, it will be apparent to those skilled in the art that changes may be made to the invention as set forth in the appended claims, and in some cases certain features of the invention may be used to advantage without corresponding use of other features. For example, different types of semiconductors or solid state control devices may be substituted for the types illustrated. Accordingly, it is intended that the illustrative and descriptive materials herein be used to illustrate the principles of the invention and not to limit the scope thereof.

Having described the invention, what is claimed is:

1. A blasting machine for detonating blasting caps or the like which comprises:
   means for storing electrical energy;
   means for discharging said energy storage means through said blasting caps when said energy storage means reaches a predetermined energy level;
   manually operable generating means having a rotor and a stator which upon rotation of the rotor generates an alternating current, said stator having first and second output terminals; and
   means for rectifying the current leaving the output terminals of the stator and supplying energy to said means for storing electrical energy, said rectifying means including at least two capacitors arranged in electrical circuit relationship with at least two diode means and said energy storage means so that said two capacitors are charged in parallel on the first half-cycle of said alternating current generator and charged in series on the second half-cycle of said alternating current generator whereby the impedance of said rectifying circuit alternately varies.

2. A blasting machine as recited in claim 1 wherein said current rectifying means includes:
   a first series connected capacitor and diode connected across the output terminals of said stator so that the cathode of said first diode is connected to the first output terminal of said stator, and a second series connected capacitor and diode connected across the output terminals of the stator so that the anode of said second diode is connected to the second output terminal of said stator;

a first output lead having one end connected to the junction of the first diode and the first capacitor; and a second output lead having one end connected to the junction of said second capacitor and second diode, said first and second output leads connected in electrical circuit relationship with said energy storage means for supplying energy thereto.

3. A blasting machine as recited in claim 2 wherein said second output lead includes a third diode means to permit current to flow in only one direction through said second lead and said energy storage means is a third capacitor having one terminal connected in series with said third diode and the other terminal connected in series to said first output lead whereby said first, second and third capacitors are charged in series during only said second half-cycle.

4. A blasting machine for detonating blasting caps or the like which comprises:

means for generating an alternating voltage, said generating means having a rotor that includes a permanent magnet and a stator winding;

means for rectifying said alternating voltage, said rectifying means including three capacitors and three diodes in circuit relationship with the stator winding of said generating means, said capacitors and diodes arranged in circuit relationship so that two of said capacitors are charged in parallel when the current leaving the stator winding of the generating means is in one direction and said three capacitors are charged in series when the current leaving the stator is in the other direction;

means for indicating when the energy in at least one of said capacitors reaches a predetermined energy level; and means for discharging the energy in at least one of said capacitors through said blasting caps when said predetermined energy level is reached.

5. The blasting machine as recited in claim 4 wherein said two capacitors charged in parallel have a capacitance less than 1/100 of said remaining capacitor.

6. A blasting machine for detonating blasting caps or the like which comprises:

means for storing electrical energy;

a manually operable alternating current generating means for supplying electrical energy to said storage means, said generating means having a rotor that includes at least one permanent magnet and a stator winding;

current rectifying means in electrical circuit relationship with said stator winding of said current generating means and said energy storage means to permit the passage of current from said generator to said storage means in only one direction, said rectifying means including at least two capacitors and at least two diodes in electrical circuit relationship with said stator so that said capacitors are charged in parallel when the current from the stator is in one direction and charged in series when the current from said stator is in the other direction;

means for producing a plurality of electrical trigger pulses when said energy storage means has reached a predetermined energy level; and means for receiving said electrical pulses and discharging said energy storage means through said blasting caps only during the presence of said pulses, whereby said energy storage means cannot be discharged below said predetermined energy level.

7. The combination as recited in claim 6 wherein said means for storing electrical energy includes a series connected diode and a third capacitor connected in electrical circuit relationship with said rectifying means so that said third capacitor is charged in series with at least two capacitors of said rectifying means in only one of said current directions.

8. The combination as recited in claim 7 including means for giving an indication that said trigger pulses are being generated.

9. The combination as recited in claim 6 wherein said means for discharging said energy storage means includes a first normally nonconductive gaseous conductor in circuit relationship with said pulse means, said first gaseous conductor being rendered conductive upon receiving said pulses whereby when pulses from said pulse means are transmitted to said first gaseous conductor, said first gaseous conductor is rendered conductive to permit said storage means to discharge.

10. The combination as recited in claim 9 including a switch connected between said first gaseous conductor and said pulse means, said switch operable in the ON position to permit the passage of said pulses to said first gaseous conductor whereby said energy storage means is discharged only when said switch is in the ON position and said pulse means is producing pulses.

11. The combination as recited in claim 6 wherein said means for producing electrical trigger pulses comprises: a second normally nonconductive gaseous conductor which rendered conductive when a predetermined voltage is applied thereto, and a resistor-capacitor circuit in series with said second gaseous conductor so that when said second gaseous conductor is rendered conductive, said capacitor lowers the voltage applied to said second gaseous conductor below said predetermined value and said second gaseous conductor is rendered nonconductive.

12. The combination as recited in claim 9 wherein said means for producing electrical pulses comprises: a second normally nonconductive gaseous conductor which is rendered conductive when a predetermined voltage is applied thereto, and a resistor-capacitor circuit in series with said second gaseous conductor so that when said second gaseous conductor is rendered conductive, said capacitor lowers the voltage applied to said second gaseous conductor below said predetermined value and said second gaseous conductor is rendered nonconductive.

13. The combination as recited in claim 10 wherein said means for producing electrical pulses comprises: a second normally nonconductive gaseous conductor which is rendered conductive when a predetermined voltage is applied thereto, and a resistor-capacitor circuit in series with said second gaseous conductor so that when said second gaseous conductor is rendered conductive, said capacitor lowers the voltage applied to said second gaseous conductor below said predetermined value and said second gaseous conductor is rendered nonconductive.

14. The combination recited in claim 9 wherein said first gaseous conductor is a 3-electrode spark gap and said pulse generating means includes means for indicating the presence of pulses whereby operation of said switching means permits the discharge of the energy in said energy storage means through said blasting caps.

15. The combination recited in claim 10 wherein said first gaseous conductor is a 3-electrode spark gap and said pulse generating means includes means for indicating the presence of pulses whereby operation of said switching means permits the discharge of the energy in said energy storage means through said blasting caps.

16. The combination recited in claim 12 wherein said first gaseous conductor is a 3-electrode spark gap and said pulse generating means includes means for indicating the presence of pulses whereby operation of said switching means permits the discharge of the energy in said energy storage means through said blasting caps.

17. The combination recited in claim 13 wherein said first gaseous conductor is a 3-electrode spark gap and said pulse generating means includes means for indicating the presence of pulses whereby operation of said switching means permits the discharge of the energy in said energy storage means through said blasting caps.

18. The combination recited in claim 11 wherein said second gaseous conductor is a 2-electrode spark gap.

19. The combination recited in claim 12 wherein said second gaseous conductor is a 2-electrode spark gap.

20. The combination recited in claim 13 wherein said second gaseous conductor is a 2-electrode spark gap.

21. The combination recited in claim 14 wherein said second gaseous conductor is a 2-electrode spark gap.

* * * * *